US008825838B2

(12) United States Patent
Suit

(10) Patent No.: US 8,825,838 B2
(45) Date of Patent: Sep. 2, 2014

(54) IDENTIFICATION OF BUSINESS PROCESS APPLICATION SERVICE GROUPS

(75) Inventor: John M. Suit, Mount Airy, MD (US)

(73) Assignee: Red Hat, Inc., Raleigh, NC (US)

( * ) Notice: Subject to any disclaimer, the term of this patent is extended or adjusted under 35 U.S.C. 154(b) by 178 days.

(21) Appl. No.: 12/905,565

(22) Filed: Oct. 15, 2010

(65) Prior Publication Data

US 2012/0096142 A1    Apr. 19, 2012

(51) Int. Cl.
G06F 15/16    (2006.01)
G06F 17/00    (2006.01)
H04L 29/08    (2006.01)
G06F 11/30    (2006.01)

(52) U.S. Cl.
CPC ............ *H04L 67/22* (2013.01); *H04L 67/02* (2013.01); *G06F 11/3006* (2013.01)
USPC ............................................. 709/224; 706/50

(58) Field of Classification Search
USPC ............................................. 709/224; 706/50
See application file for complete search history.

(56) References Cited

U.S. PATENT DOCUMENTS

| | | | |
|---|---|---|---|
| 6,513,059 B1 * | 1/2003 | Gupta et al. ................. | 709/202 |
| 6,658,465 B1 * | 12/2003 | Touboul ........................ | 709/223 |
| 6,871,223 B2 | 3/2005 | Drees | |
| 7,571,349 B2 | 8/2009 | Levidow et al. | |
| 7,624,172 B1 | 11/2009 | Austin-lane | |
| 7,769,720 B2 | 8/2010 | Armington | |
| 7,793,162 B2 | 9/2010 | Mock et al. | |
| 7,826,602 B1 | 11/2010 | Hunyady et al. | |
| 7,890,318 B2 | 2/2011 | Castellani et al. | |
| 7,953,696 B2 | 5/2011 | Davis et al. | |
| 7,975,058 B2 | 7/2011 | Okmianski et al. | |
| 8,156,378 B1 | 4/2012 | Suit | |
| 8,185,442 B2 | 5/2012 | Kiran Vedula | |
| 8,234,377 B2 | 7/2012 | Cohn | |
| 8,295,277 B2 | 10/2012 | Vadlakonda et al. | |
| 8,656,219 B2 | 2/2014 | Suit | |
| 2003/0177112 A1 * | 9/2003 | Gardner ........................... | 707/3 |
| 2003/0225876 A1 * | 12/2003 | Oliver et al. .................. | 709/224 |
| 2004/0133672 A1 * | 7/2004 | Bhattacharya et al. ....... | 709/224 |
| 2005/0044206 A1 * | 2/2005 | Johansson et al. ............ | 709/224 |
| 2005/0240606 A1 * | 10/2005 | Edelstein et al. ............. | 707/100 |
| 2005/0268298 A1 | 12/2005 | Hunt et al. | |
| 2006/0069768 A1 | 3/2006 | Wen et al. | |
| 2006/0074833 A1 | 4/2006 | Gardner et al. | |
| 2006/0195715 A1 | 8/2006 | Herington | |
| 2006/0230134 A1 * | 10/2006 | Qian et al. .................... | 709/224 |
| 2007/0083506 A1 * | 4/2007 | Liddell et al. ..................... | 707/5 |
| 2007/0220121 A1 | 9/2007 | Suwarna | |
| 2008/0256010 A1 | 10/2008 | Moran et al. | |
| 2009/0028053 A1 | 1/2009 | Kannan et al. | |

(Continued)

OTHER PUBLICATIONS

Red Hat Office Action for U.S. Appl. No. 12/905,645, mailed Sep. 13, 2012.

(Continued)

*Primary Examiner* — Kevin C Harper
*Assistant Examiner* — Peter Chen
(74) *Attorney, Agent, or Firm* — Lowenstein Sandler LLP

(57) ABSTRACT

One or more business process application service groups may be categorized. An ontological definition of an enterprise network can then be analyzed to identify one or more structures within the enterprise network that correlate to the one or more categorized business process application service groups.

18 Claims, 7 Drawing Sheets

(56) References Cited

U.S. PATENT DOCUMENTS

| | | |
|---|---|---|
| 2009/0182880 A1* | 7/2009 | Inamdar et al. ............... 709/226 |
| 2009/0204701 A1 | 8/2009 | Herzog et al. |
| 2009/0228579 A1* | 9/2009 | Sanghvi et al. ............... 709/224 |
| 2009/0228589 A1 | 9/2009 | Korupolu |
| 2009/0307772 A1 | 12/2009 | Markham et al. |
| 2010/0049731 A1 | 2/2010 | Kiran Vedula |
| 2010/0138390 A1 | 6/2010 | Lobo |
| 2010/0161604 A1 | 6/2010 | Mintz et al. |
| 2010/0287263 A1 | 11/2010 | Liu et al. |
| 2010/0318609 A1 | 12/2010 | Lahiri et al. |
| 2012/0096065 A1 | 4/2012 | Suit |
| 2012/0096134 A1 | 4/2012 | Suit |
| 2012/0096143 A1 | 4/2012 | Suit |
| 2012/0096171 A1 | 4/2012 | Suit |
| 2012/0221898 A1 | 8/2012 | Suit |
| 2013/0060839 A1 | 3/2013 | Biljon et al. |

OTHER PUBLICATIONS

Red Hat Office Action for U.S. Appl. No. 12/905,645, mailed Mar. 26, 2013.
Red Hat Office Action for U.S. Appl. No. 12/905,688, mailed Oct. 4, 2012.
Red Hat Office Action for U.S. Appl. No. 12/905,688, mailed Feb. 27, 2012.
Red Hat Office Action for U.S. Appl. No. 12/905,761, mailed Oct. 22, 2012.
Red Hat Office Action for U.S. Appl. No. 12/905,761, mailed Apr. 11, 2013.
Red Hat Office Action for U.S. Appl. No. 12/905,850, mailed Dec. 6, 2012.
Red Hat Office Action for U.S. Appl. No. 12/905,879, mailed Jul. 8, 2011.
Red Hat Notice of Allowance for U.S. Appl. No. 12/905,879, mailed Dec. 8, 2011.
Red Hat Office Action for U.S. Appl. No. 13/439,803, mailed Aug. 31, 2012.
Red Hat Notice of Allowance for U.S. Appl. No. 13/439,803, mailed Feb. 21, 2012.
Red Hat Office Action for U.S. Appl. No. 12/905,688, mailed Sep. 11, 2013.
Red Hat Office Action for U.S. Appl. No. 12/905,688, mailed Mar. 18, 2014.
Red Hat Notice of Allowance for U.S. Appl. No. 12/905,761, mailed Oct. 4, 2013.
Red Hat Office Action for U.S. Appl. No. 12/905,850, mailed Jul. 30, 2013.
Red Hat Office Action for U.S. Appl. No. 12/905,850, mailed Feb. 18, 2014.

* cited by examiner

IDENTIFICATION OF BUSINESS PROCESS APPLICATION SERVICE GROUPS

CROSS-REFERENCE TO RELATED APPLICATIONS

This application relates to co-pending applications: U.S. patent application Ser. No. 11/767,173, filed on Jun. 22, 2007, titled "Method and system for cloaked observation and remediation of software attacks"; U.S. patent application Ser. No. 11/867,456, filed on Oct. 4, 2007, titled "Method and system for collaboration involving enterprise nodes"; and U.S. patent application Ser. No. 12/626,872, filed on Nov. 27, 2009, titled "Network traffic analysis using a dynamically updating ontological network description".

This application further relates to the Applicant's co-pending applications: Ser. No. 12/905,645: titled "System and method for migration of network entities to a cloud infrastructure"; Ser. No. 12/905,688: titled "System and method for monitoring system performance changes based on configuration modification"; Ser. No. 12/905,761: titled "System and method for indicating the impact to a business application service group resulting from a change in state of a single business application service group node"; Ser. No. 12/905,850: titled "System and method for enterprise nodes that are contained within a public cloud to communicate with private enterprise infrastructure dependencies"; Ser. No. 12/905,879: titled "System and method for determination of the root cause of an overall failure of a business application service".

The entire contents of each of the above mentioned applications are specifically incorporated herein by reference.

FIELD OF THE INVENTION

Embodiments of the invention relate generally to network traffic analysis and, in particular, to methods and apparatus for automatic determining of service groups within a communications network.

BACKGROUND

Traditionally Enterprise networks are comprised of various nodes that contribute to an overall business process. These nodes naturally or by design form groups of nodes that perform various business processes. These groups may be referred to as Business Process Application Service Groups. Examples of business processes are email services, account and financial systems for receiving and accounts payable, collaborative development environments and other processes that provide a similar function. In an operational Enterprise environment, Enterprise nodes change dynamically. Nodes are re-configured, migrated, go off line, and have varying changes throughout the life of a given node. Enterprise Administrators have the task of connecting, configuring, and maintaining these nodes to ensure the Business Process Application is carried out, in most cases, as efficiently as possible.

BRIEF DESCRIPTION OF THE DRAWINGS

Reference will now be made, by way of example only, to specific embodiments and to the accompanying drawings in which.

DETAILED DESCRIPTION

Figure 1:
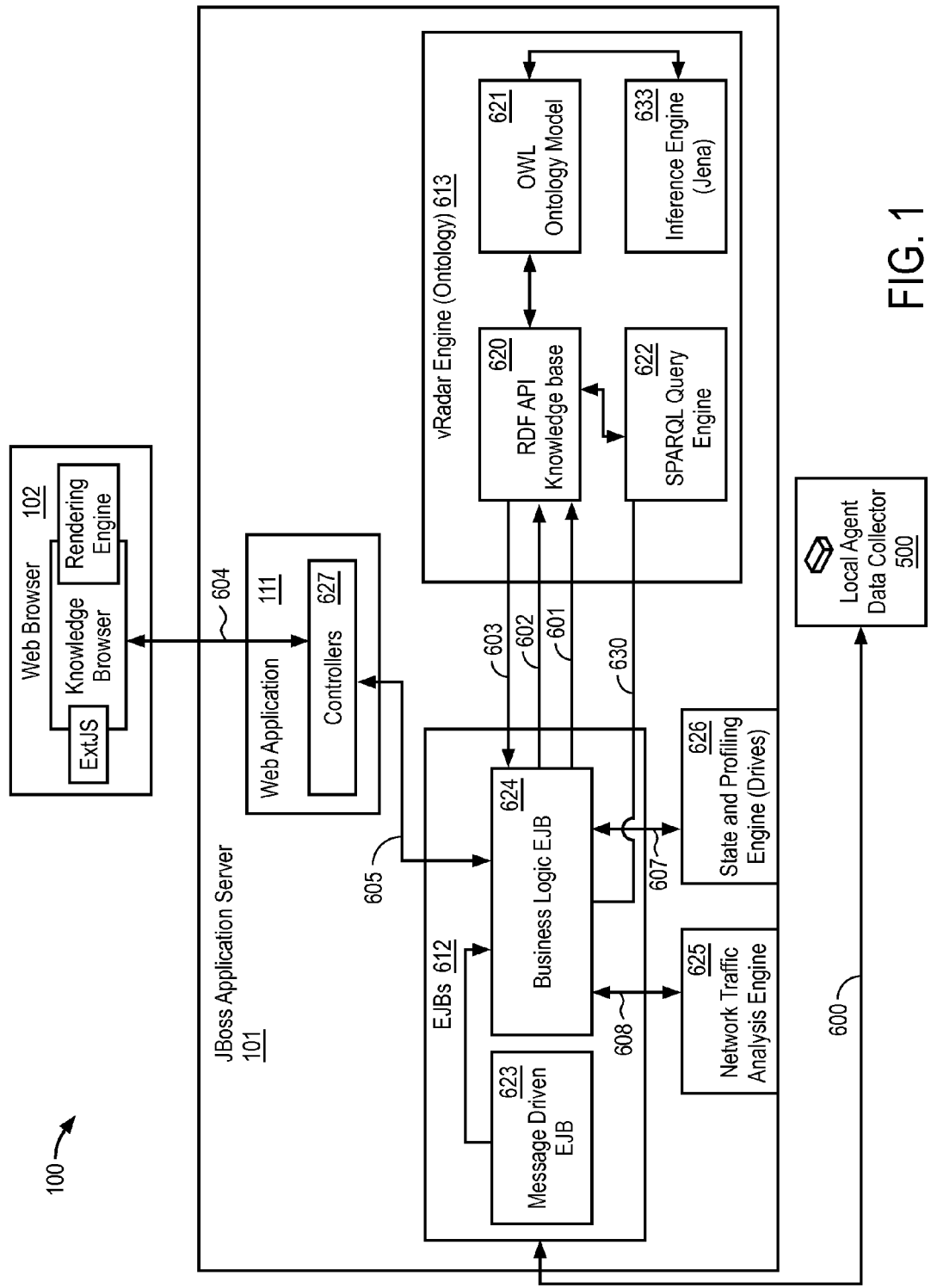
FIG. 1 is an illustrative embodiment of enterprise network including an administration console.

Methods and apparatus for identifying a business process application service group within an enterprise network comprising a plurality of entities described by an ontological structure are discussed herein. In one embodiment, a system for identifying a business process application service group within an enterprise network comprises an administration console that includes a knowledge base module and an inference engine. The knowledge base module may store an ontological description of the enterprise network. The inference engine may be configured to analyze an ontological definition of the enterprise network to identify one or more structures within the enterprise network that correlate to one or more categorized business process application service groups.

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected" or "coupled" to another element, it can be directly connected or coupled to the other element, or intervening elements may be present. Furthermore, "connected" or "coupled" as used herein may include wirelessly connected or coupled. It will be understood that although the terms "first" and "second" are used herein to describe various elements, these elements should not be limited by these terms. These terms are used only to distinguish one element from another element. Thus, for example, a first user terminal could be termed a second user terminal, and similarly, a second user terminal may be termed a first user terminal without departing from the teachings of the present invention. As used herein, the term "and/or" includes any and all combinations of one or more of the associated listed items. The symbol "/" is also used as a shorthand notation for "and/or".

In one embodiment, an enterprise IT infrastructure environment, including networks of computer entities consisting of physical and/or virtual machines located at network nodes, may be advantageously described via an ontology that describes the operational usage and current state of the entities rather than being based on a fixed IT infrastructure architecture. The ontological description may be automatically and dynamically updated based on data acquired from data collection agents deployed to the nodes of the network. The data collection agents observe communicative relationships based on connections between nodes in operational use, while annotating a class state. Using the ontological description, a network analyst or system operator may be provided with an improved ability to analyze network traffic.

Advantageously, data relating to actual connections may be acquired automatically in near real time. For example, an actual connection may be monitored in an interrupt-driven way while collecting information regarding an application that made the connection. Moreover a "volume for the connections" may be derived.

A software based data collection agent may be received by a computing device at a node within a communications network. The agent may be distributed to one or more nodes from a central node via the network. Once the software based data collection agent is received, it may be inserted in an operating system of the receiving node. Advantageously, the agent may be inserted in the kernel of the operating system or in a user space (i.e., an area in virtual memory of a computer that contains user applications that execute at the application layer). The installation may be such that it is transparent to, or undetected by a user of the node. The installed data collection agent may monitor data packet traffic between an adaptive driver layer and a protocol layer and report results of the monitoring to the central node.

In one example, the data collection agent may have an interface to an operating system's network stack and may periodically determine what applications are using the network stack. Thereby the data collection agent may track information regarding a network connection, the connection duration, and any applications and systems involved in the connection. Moreover, the data collection agent may normalize the foregoing information and report it to an administration console so that different operating systems may be correlated by the administration console.

As a further example, the data collection agent may include a network filter inserted into the network stack to determine exactly when a connection is made between entities. The filter component of the data collection agent may be inserted at one or more layers of the OSI model. For example a data collection agent may have filter interface at the transport layer and/or a filter interface at the network layer. Thereby, the data collection agent may track information regarding a network connection, the connection duration, and any applications and systems involved in the connection. Moreover, the data collection agent may normalize the foregoing information and report it to the administration console so that different operating systems may be correlated by the administration console.

As a yet further example, the data collection agent described in the preceding paragraph may also include a packet filter inserted into the network stack to track connection data. For example, a data collection agent may have a filter interface at the data link layer. Then, the data collection agent may correlate and normalize (if required) data from the network filter and the packet filter to track information regarding the network connection, the connection duration, any applications and systems involved in the connection, connection status and connection resource usage information. Moreover, the data collection agent may normalize the foregoing information and report it to the administration console so that different operating systems may be correlated by the administration console.

Referring now to FIG. 1, an illustrative system 100 for deploying data collection agents onto network nodes, monitoring network connections instantiated at each network node, acquiring resulting data, automatically creating an ontological description of the network from the acquired data; and dynamically updating the ontological description will be described. The system 100 may further be used for automatically identifying Business Process Application Service Groups within an enterprise network as will be described in more detail below. In an embodiment, elements of system 100 utilize the Java software platform and Enterprise Java Bean (EJB) architecture to provide certain functionality, and these well-known terms may be used in the description that follows. Other software platforms and architectures, such as JBoss Java Platform, Enterprise Edition, providing similar functionality may be used without departing from the scope of the present invention.

System 100 may comprise an application server 101, which interacts across a network with a number of data collection agents 500 deployed in various nodes of the network. These nodes include physical hosts, virtual machines, network devices, storage devices, and other nodes that provide a similar function. Advantageously, application server 101, may be an element of an administrative console (AC) that also provides a suite of network management tools. A system administrator may perform network traffic analysis and/or other network management tasks by accessing application server 101 by way of web browser 102. Application server 101 may comprise an EJB module 612, an ontological description creation engine 613, and a web application 111.

Data collection agents 500, as described hereinabove, may be deployed onto network nodes including physical and/or virtual machines in an enterprise IT infrastructure environment. After such deployment, application server 101 receives messages from data collection agents 500. These messages may include data representing, for example, state and relationship information about the network nodes, configuration information related to the IT infrastructure, performance/utilization data and network communication.

The received messages may be initially handled by EJB module 612. For example, message driven EJB 623 may initially inspect a received message. A received message relating to network traffic or node status may be forwarded by message driven EJB 623 to the Business Logic EJB 624. Business Logic EJB 624 may call Network Traffic Analysis Engine 625 for messages relating to network traffic. Alternately, "infrastructure messages" (i.e., those relating to node status) may be forwarded directly to the State and Profiling Engine 626.

Messages forwarded to the state and profiling engine 626 may there undergo sorting and processing. The state and profiling engine 626, for example, may identify the entities within the IT Infrastructure as well as their dependency on one another, based on messages received from the platform. In addition, state and profiling engine 626 may perform further processing to determine the state of one or more entities. State may be based on a threshold that has been defined, for example, by the system administrator. The threshold may consist of a metric that either exceeds or underperforms in a specific area of interest to the system administrator. An example would be where a server in a network is exceeding a specified CPU utilization percentage.

A data output from state and profile engine 626 may be sent via signal flow paths 607 and 601 to ontological description creation engine 613. Initially, the data may be handled by Resource Description Framework (RDF) API knowledge base 620 where the data is categorized and stored utilizing a predefined entity relationship, determined by the Web Ontology Language (OWL) API 621. OWL is a family of knowledge representation languages for authoring ontologies which are a formal representation of the knowledge by a set of concepts within a domain and the relationships between those concepts. Ontologies are used to reason about the properties of that domain, and may be used to describe the domain. OWL Web Ontology Language standard is maintained by The World Wide Web Consortium (W3C) API 621.

Messages handled by the Network Traffic Analysis Engine 625 may include source-to-destination data, qualified by a communicating application within the operating system of the originating node, as well as frequency of communication information. This data is analyzed by processing the number and type of connections to determine if an Ontological "communicates_with" relationship exists. A determination may be made by tracking the number of connections of a specific application over a period of time. The period of time may be a system default time or may be preselected, for example, by the system administrator. Importantly, by analyzing such data as source-to-destination data, "communicates_with" relationships can be revealed between two or more nodes even where there is no direct architectural relationship between those nodes.

A data output from network traffic analysis engine 625 may be sent via signal flow paths 608 and 602 to ontological description creation engine 613. Initially, the data may be handled by RDF API Knowledge base 620 where the data is categorized and stored utilizing a predefined entity relationship, determined by OWL API 621. For example OWL API 621 may define what entity classes exist, their possible relationship to each other, and their possible state. The RDF Knowledge Base 620 contains an Ontology for each individual node. The model and structure the system uses to create and update the knowledge base is contained within the OWL file present on the application server.

Figure 2:
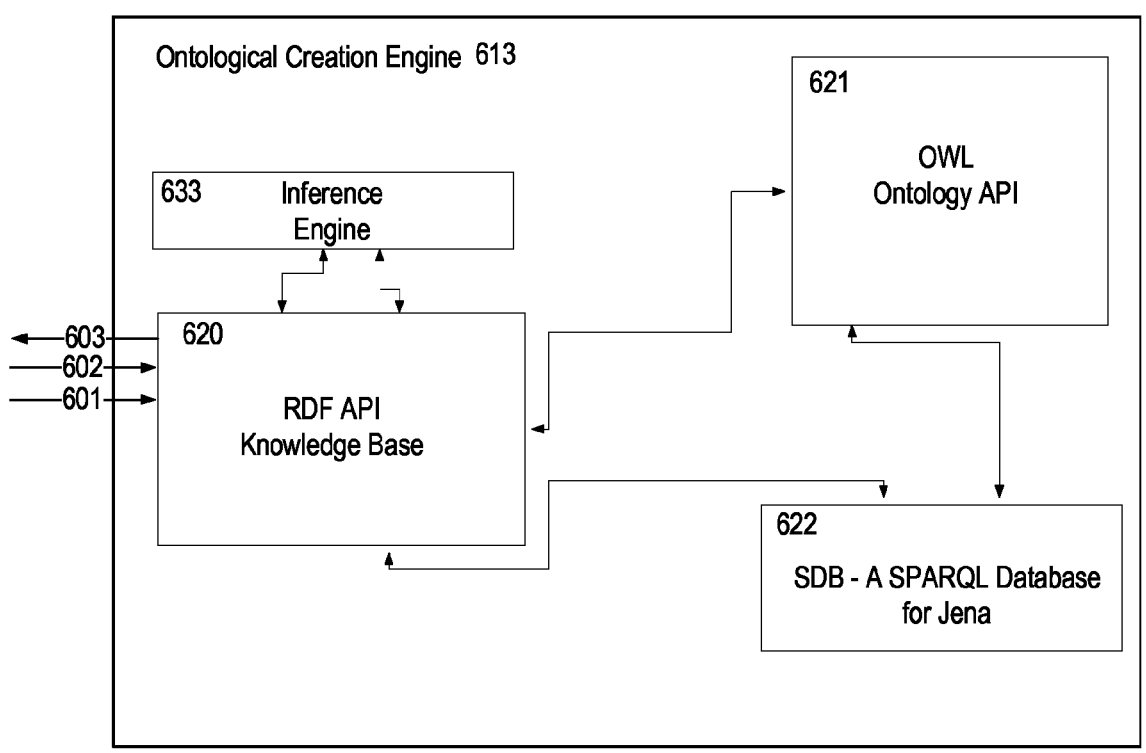
FIG. 2 is an illustrative embodiment of an ontological creation engine.

Referring now to FIG. 2, as data is received by RDF API Knowledge Base 620, logic in the RDF API Knowledge Base 620 may map the incoming data to the appropriate ontological classes and relationships defined by OWL Ontology API 621. Once the correct classes and relationships are chosen, the entity and relationship information may be entered into RDF API Knowledge Base 620. The knowledge base may also be forwarded to SPARQL database and query language SPARQL Database for Jena 622 for later inference processing by inference engine 633. Inference engine 633 may determine inferred relationships based on the ontology model contained in OWL Ontology API 621. SPARQL is an Resource Description Framework (RDF) query language. Its name is a recursive acronym that stands for SPARQL Protocol and RDF Query Language. It was standardized by the RDF Data Access Working Group (DAWG) of the World Wide Web Consortium, and is considered a key semantic web technology. Jena is a Java framework for building Semantic Web applications. It provides a programmatic environment for RDF, RDF Schema (RDFS) and OWL, SPARQL and includes a rule-based inference engine.

Figure 3:
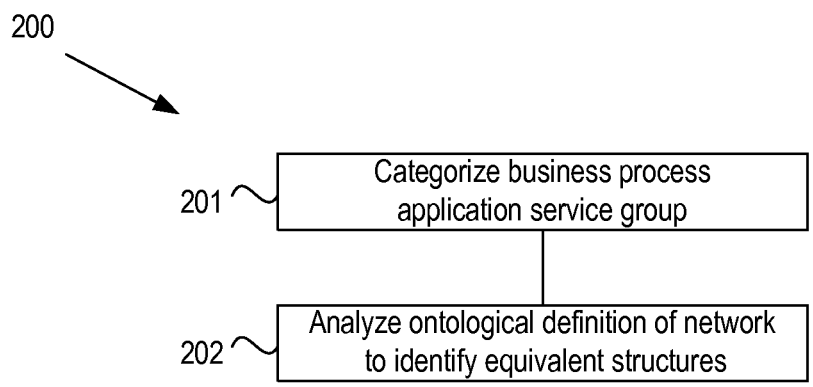
FIG. 3 depicts a flow diagram of one embodiment of a method for identifying a business process application service group within an enterprise network.

Once the ontological description of the network has been obtained, it may be used for identifying business process application service groups within the operational enterprise environment. The enterprise environment may be comprised of entities within a local enterprise network as well as entities deployed within a public or private cloud-based infrastructure. An exemplary method of this process, performed by inference engine 633, is illustrated in FIG. 3. The method of FIG. 3 is performed by processing logic that may comprise hardware (circuitry, dedicated logic, etc.), software (such as is run on a general purpose computer system or a dedicated machine), or a combination of both.

Referring to FIG. 3, at block 201, one or more business process application service groups are categorized. As will be described in more detail below, the business process application service groups may be categorized by generating an ontological description including communications relationships for a primary application of the respective business process application service group. At block 202, the ontological definition of the enterprise network is analyzed to identify one or more structures within the enterprise network that correlate to the one or more categorized business process application service groups.

The basis for the automatic detection is provided in the Ontological structure of a categorized Business Process Application Service Group. The ontological structure of the system may be described in an Ontology Web Language format within an OWL file. This file contains a structure that contains classes, Object Properties, and Data Values. The classes are the enterprise entities, such as; physical machine, virtual machines, networks, and storage. The Object Property describes the relationships of the classes. For example Physical machine "A" has Network "A" and uses Storage "B", "C", and "D". Each class type as well as attribute value has several Data Values available. A Data Value is a quantification of the class or Object Property. Such as Physical Machine "A" is of type "ESX Server", "Four Socket", "64 Gigabytes memory", and so on.

The inference engine 633 may process the Classes and Attributes of the OWL file to find a structure that matches a user defined and categorized Business Process Application Service Group. In one embodiment, the match may be determined by assigning a score to each categorized service group type, and then comparing relative scores of service groups to find a Service Group within a user definable score window. The inference engine identifies Service Groups that are a relative match to a user selected categorized Business Process Application Service Group.

Figure 4:
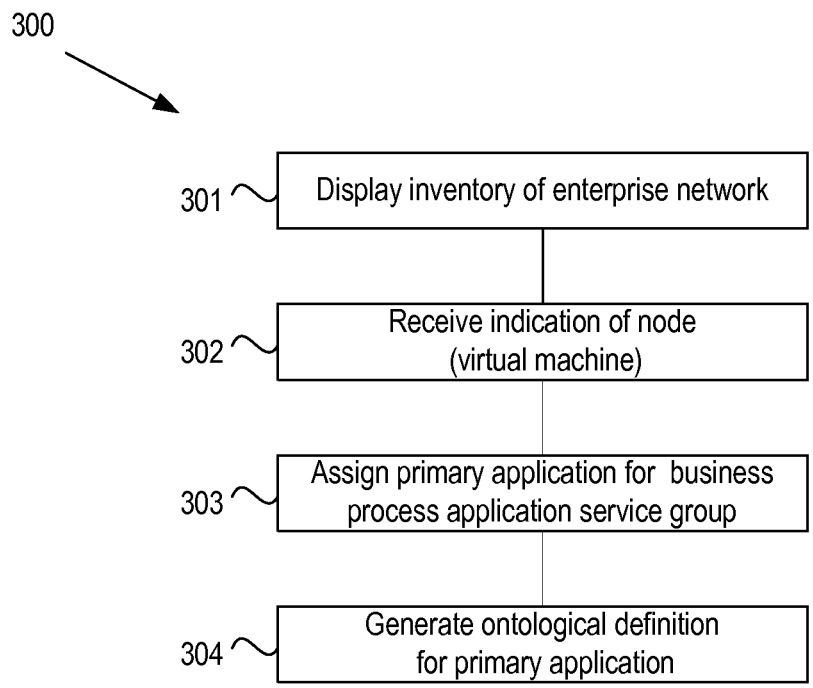
FIG. 4 depicts a flow diagram of one embodiment of a method for categorizing a business process application service group.

In order to identify uncategorized business process application service groups, it is necessary to define or categorize one or more baseline Business Process Application Service Groups to provide a means of comparison. A process for categorizing a Business Process Application Service Group will now be described with reference to FIG. 4. The method of FIG. 4 is performed by processing logic that may comprise hardware (circuitry, dedicated logic, etc.), software (such as is run on a general purpose computer system or a dedicated machine), or a combination of both. The method of FIG. 4, including some or all of the user inputs described below, may be used by the system 100 which receives a name from the user related to the Business Process Application Service Group which is based on the executable that establishes the "communicates_with" relationship that the system has automatically discovered.

Referring again to FIG. 4, once agents are installed, application communications are tracked. Information is collected and analyzed by the network traffic engine including the application making the connection, number of connections, connection duration, connection status, connection resource usage information and the systems involved in the conversation. Through the web application 111, a user such as a system administrator may view an inventory of the enterprise network (block 301). The inventory may list all of the nodes of the network, as determined by the agent processes described above. Using the inventory interface, the user may then indicate a node, such as a virtual machine (block 302).

Figure 5:
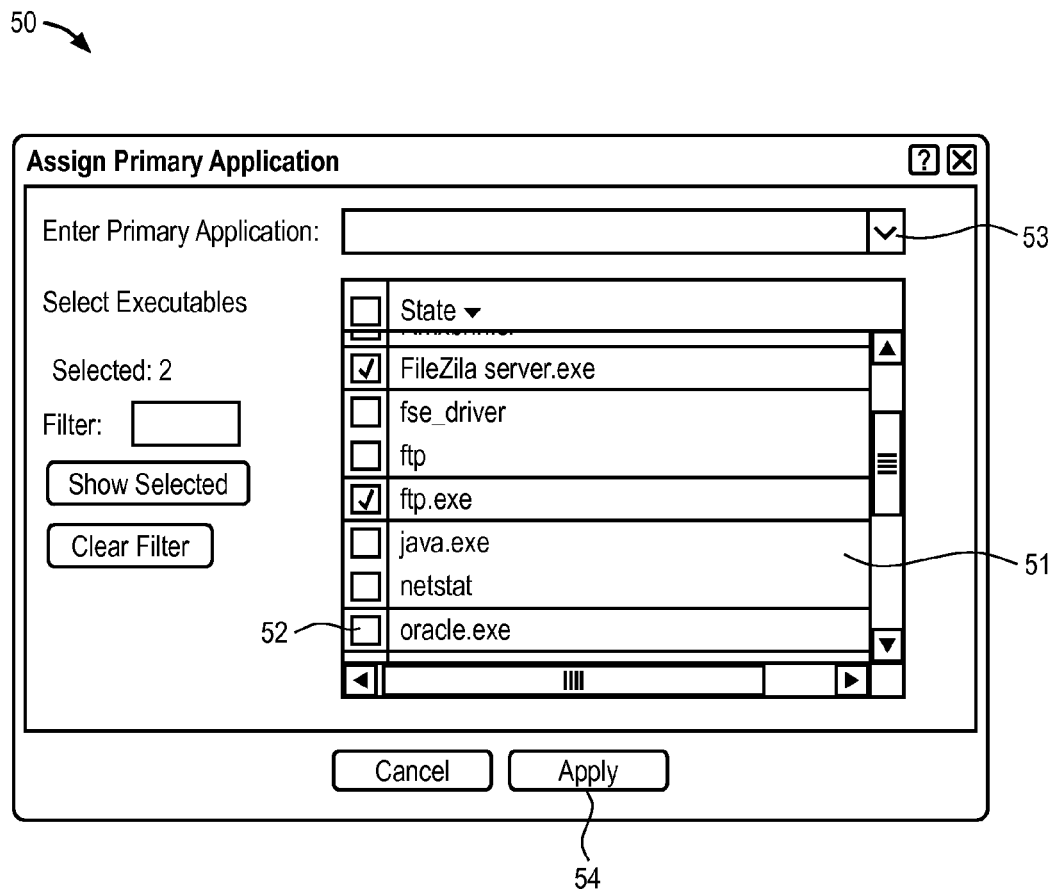
FIG. 5 depicts an interface for indicating a primary application.

An assign primary application function may then be selected for the selected nodes (block 303). An interface 50 for assigning the primary function is shown in FIG. 5. The interface 50 lists the executables 51 available for the selected virtual machine. These executables are the files that are executed to perform the tasks required for the business process. The user may define the primary application by selecting checkboxes 52 associated with each executable. Alternatively, the user may select a primary application from a drop-down menu 53, which causes a default list of executables to be selected. By selecting an assign icon 54, the user is able to assign the primary application, including the selected executables, to the virtual machine.

Once the primary application has been indicated by the user, the primary application may be treated as a "node" by the RDF Knowledge base 620. That is, using the agent processes described above, an ontology may be created for the primary application by analyzing the components of the network which have "communicates_with" relationships with the defined executables of the primary application. This ontology may be generated and stored in the RDF Knowledge base as a categorized Business Process Application Service Group (block 304). Once the Ontology for a Business Application Service Group has been created and added to the RDF Knowledge Base 620, the Business Process Application Service Group may be used as a baseline for the automatic detection of similar but uncategorized service groups within the network ontology.

Defining a primary application and then determining an ontology for the primary application is one way in which a business process application service group may be defined. Other methods will be apparent to a person skilled in the art. In one alternative example, an interface may be provided that allows a user to build the baseline on a blank template, adding the components that are required to perform the functions of the service group.

As will be described in more detail below, the identification of uncategorized business process application service groups within the network may be facilitated by assigning one or more values to the categorized Business Process Application Service Group. This process may be performed by the Business logic EJB 624 requesting the categorized business process application service groups from the RDF API knowledge base 620. An example of such values include:

1312=1 Host Class of type ESX;
273=2 Guests of type Linux RH5 with a "communicates with relationship" with 3 Executables comprising no specific primary application;
20003=2 Guest has a communicates_with relationship with each other;
2982=2 Storage devices of type Netapp with 4 Direct guest connections; and
40214=4 network connections of type Cisco.

The SQARQL Engine 622 then initiates a query to gather all the class, object properties, and data values for the categorized Business Process Application Service Group from the knowledge base 624. The Rules engine 626, indicated in FIG. 1 as the State and Profiling Engine, then analyzes these elements and assigns them a score called a Service group ontological index score.

Figure 6:
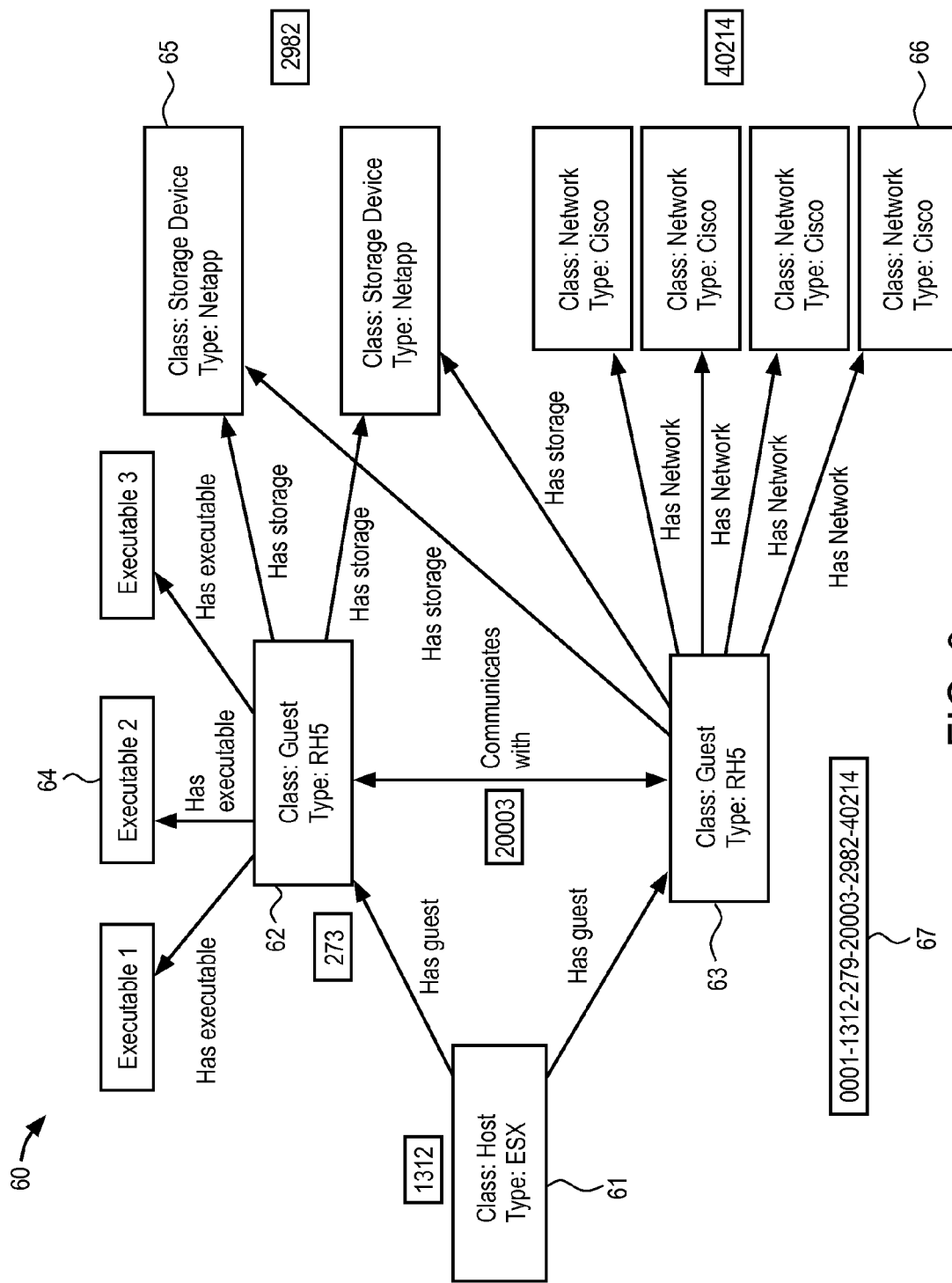
FIG. 6 depicts an ontological description for a business process application service group including an ontological index score.

Values may be assigned to the various components and elements of a service group so that the complete service group may have values in multiple fields. An example of a categorized business process application service group is depicted in FIG. 6. The business process application service group 60 includes a host 61 and two guests 62, 63. Each guest 62, 63 is of type "Linux RH5". Guest 62 includes three executables 64 and communicates with two storage devices 65 which are each of type "Netapp". Guest 63 has a network relationship with four virtual adapters 66, each of type "Cisco". Guest 63 also communicates with storage devices 65 and with Guest 62. The business process application service group 60 may be assigned an ontological index score 67. In the present example, the assigned value is:
00001-1312-273-20003-2982-40214
Where:
1312=1 Host Class of type ESX;
273=2 Guests of type Linux RH5 with a "communicates with relationship" with 3 Executables comprising no specific primary application;
20003=2 Guest has a communicates_with relationship with each other;
2982=2 Storage devices of type Netapp with 4 Direct guest connections; and
40214=4 network connections of type Cisco.

An offset may be provided to indicate the degree of fuzziness the user is willing to accept as a deviation from these field values. In a manual mode, the offset may be indicated by the user. In an automatic mode, the offset may be created by calculating the number of classes within a categorized Business Process Application Service Group, taking the minimum offset of 1 per data value, and increasing it by a multiple of 2 for each doubling of the number of categorized Business Process Application Service Group classes.

Figure 7:
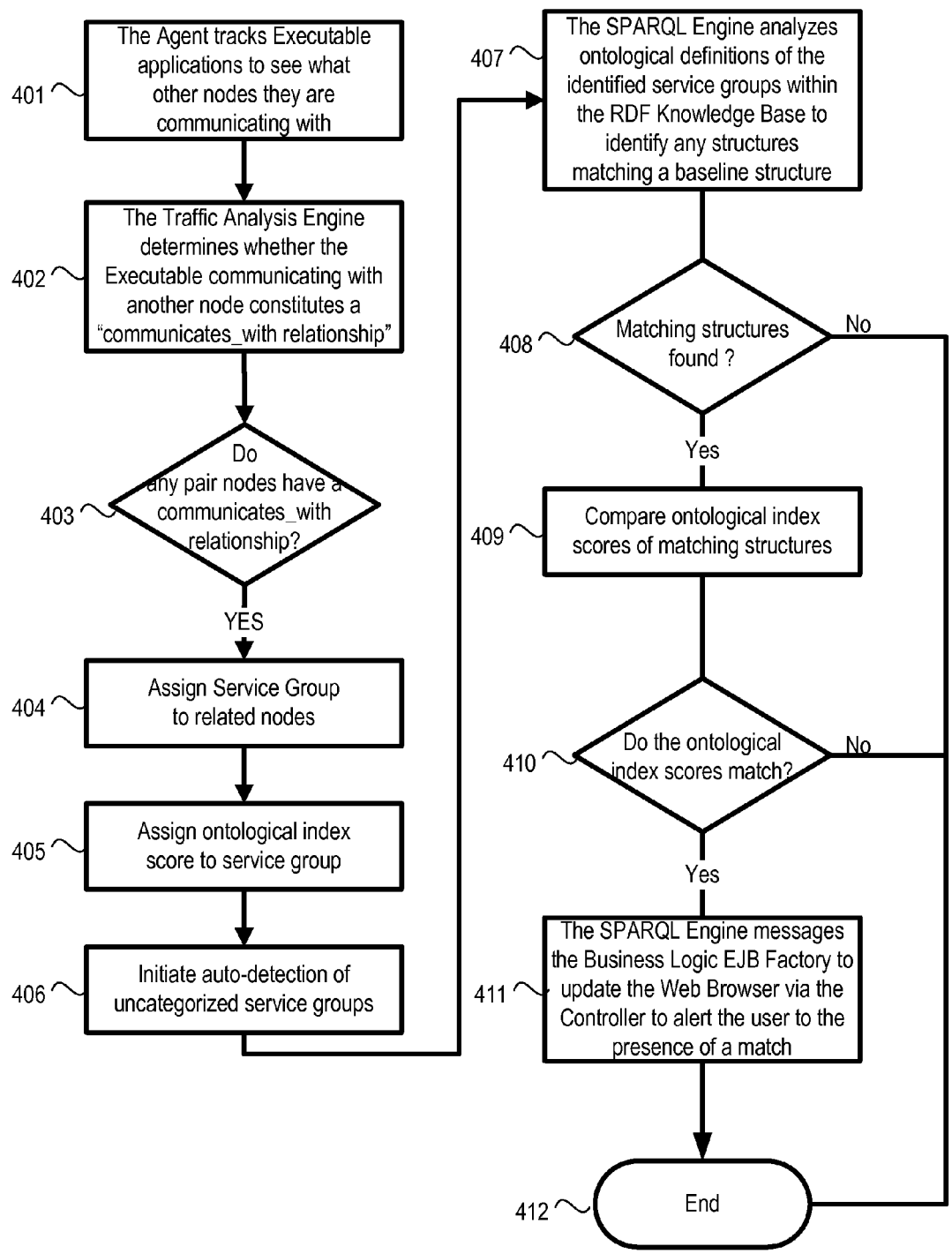
FIG. 7 depicts a flow diagram of one embodiment of a method for identifying service groups within the enterprise network that match a business process application service group.

An embodiment of the process for the automatic detection of uncategorized business process application service groups will now be described with reference to FIG. 7. The method of FIG. 7 is performed by processing logic that may comprise hardware (circuitry, dedicated logic, etc.), software (such as is run on a general purpose computer system or a dedicated machine), or a combination of both.

Prior to the process commencing, it is assumed that the enterprise network has been established and that an ontological structure of the network has been created. It is further assumed that one or more Business Process Application Service Groups have been categorized.

At block 401, the software Agents that have been deployed via the physical Hosts directly to the operating systems of the Virtual Machines track the executable applications on their respective nodes to see what other nodes those executables are communicating with. This information is communicated, via a proxy agent, to the Traffic Analysis Engine 625, which determines whether the executable communicating with another node constitutes a "communicates_with" relationship (block 402). A "communicates_with" relationship may be determined, for example, by analyzing the application making the connection, the number of connections, connection duration, connection status, connection resource usage information and the systems involved in the conversation. At block 403, a determination is made as to whether any pair nodes have a communicates_with relationship. Upon the assignment of a communicates_with relationship to the Ontology of a node and its direct and indirect relationships, the state and profile engine assigns the group of nodes as a "Service Group" (block 404). Thus, the system automatically creates a Service Group for any Ontology with a communicates_with relationship. At block 405, the State and Profile engine 626 assigns each identified service group an ontological index score.

At various times, the system administrator may wish to analyze the network ontology, including the identified service groups, to determine whether any of the identified service groups are similar to the categorized Business Process Application Service Groups described above. The system administrator may therefore initiate the auto-detection at block 406.

At block 407, the SPARQL Engine 622 selects a baseline and the inference engine 633 analyzes the structures of the identified service group to determine if there are any identified service groups that match or resemble the structure of the categorized Business Process Application Service Group. If a match is found (determination block 408), the inference engine 633 determines if the score of the identified service group structure correlates to the score of the categorized Business Process Application Service Group (block 409). The correlation may allow for any automatically or manually defined offsets. That is, an exact correlation of the ontological index scores may not be required, but instead, a match may be indicated if the scores are correlated within a reasonable window. While the comparison of ontological index scores is described herein in detail, other methods for determining correlation between identified service groups and a baseline Business Process Application Service Group will be apparent to a person skilled in the art.

If the score of the identified structure correlates to the score of the baseline structure (block 410), then the SPARQL Engine 622 messages the Business Logic EJB Factory to update the Web Browser 102 via the Controller 627 to alert the user to the presence of a match (block 411). The process commencing at block 407 may be repeated for each categorized baseline group that has been previously defined by the user. Once the full analysis of the baselines has been performed, the process terminates 412.

When the user has been notified of a matching but uncategorized business application service group, the matching group may be displayed by the web application 111 on the user interface 102. On the interface, nodes may be added that the system did not auto-detect as a component of the service group.

In one embodiment, the inference engine 633 may identify like and non-like service groups for each baseline Business Process Application Service Group. The purpose of identifying non-like groups aids the rules engine with accuracy when only a small number of Business Process Application Service Group have been categorized by the user. By defining which groups are not candidates for "like" groups, the rules engine can create separate sets of groups based on how the user assigns like and unlike groups. Once two or more Business Process Application Service Groups have been categorized, the system may begin to differentiate the ontology structures relative to each other by iterating through the ontological structure for class, attribute values, and data deltas.

When analyzing each categorized Business Process Application Service Group, the inference engine 633 iterates up and down the ontological structure defined in the OWL file to identify any service group structures that are similar to the structure of the categorized baseline. The Ontological tree structure is analyzed utilizing the number of layers found in the categorized Business Process Application Service Group. For example, if a categorized Business Process Application Service Group has 4 branches or layers then the inference engine 626 traverses the ontological structure to find a 4 layer structure with a matching combination of classes and object properties. If a matching structure is found, then the uncategorized Business Process Application Service Group is analyzed for like data values. These data values are compared to the categorized Business Process Application Service Groups by the rules engine using a numerical comparison engine with an offset variable assigned by the SPARQL engine. This variable is created by calculating the number of categorized Business Process Application Service Groups and taking the minimum offset of 1 per data value, and increasing it by a multiple of 2 for each doubling of the number of categorized Business Process Application Service Group classes.

The automatic identification of structures of the enterprise network that match the categorized Business Process Application Service Group has advantages in management of the network. For example, if faults are detected in an existing structure that performs a particular process, reconfiguration of the network may be performed by analyzing the ontological description of the network for an equivalent structure that could perform the process. A further advantage is for identifying all related nodes that perform a business application process when migrating nodes to a cloud computing structure.

Figure 8:
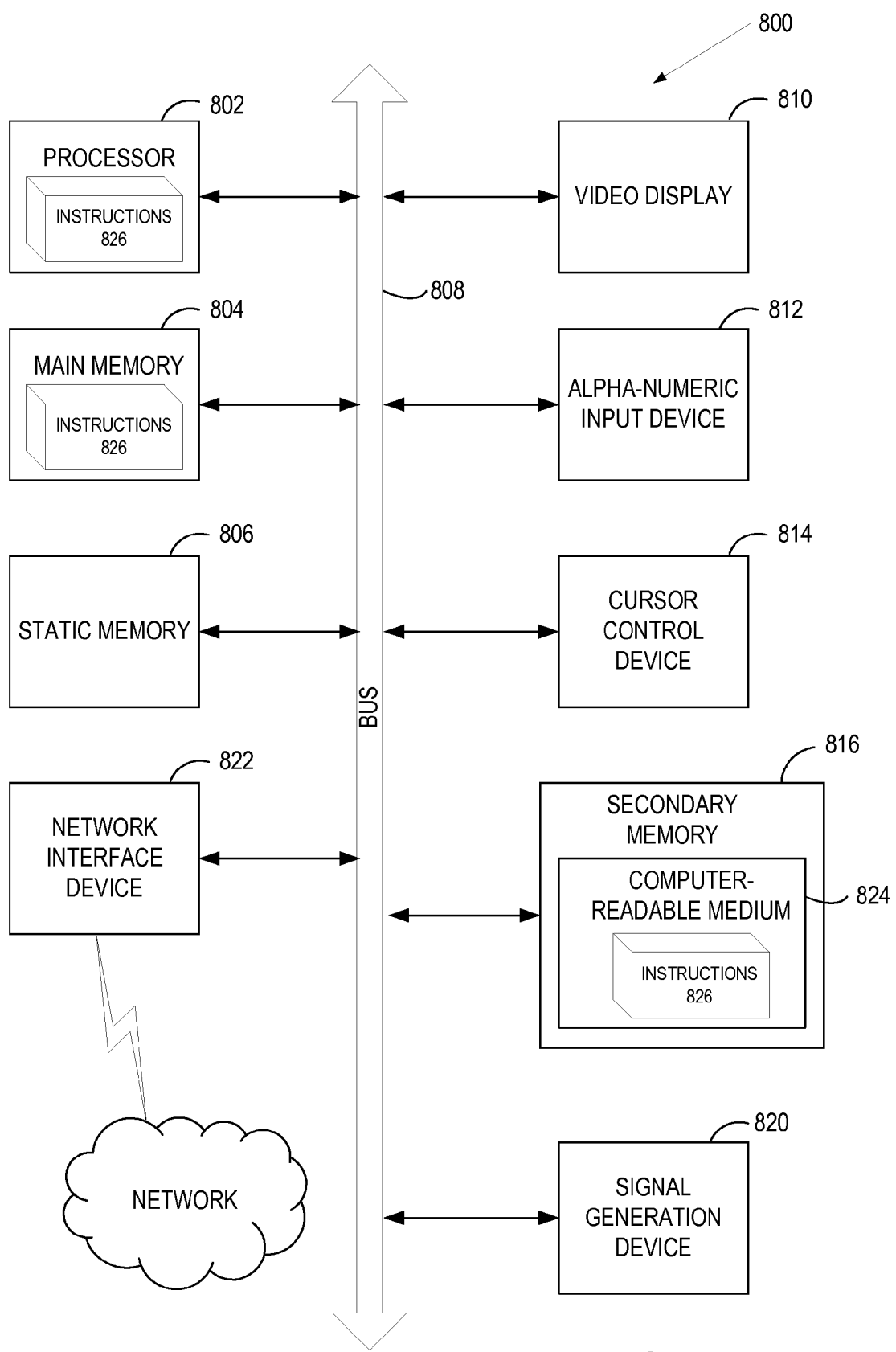
FIG. 8 is a block diagram of an exemplary computer system that may perform one or more of the operations described herein.

FIG. 8 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a secondary memory 816 (e.g., a data storage device), which communicate with each other via a bus 808.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. Processing device 802 is configured to execute instructions 826 (e.g., inference engine 633) for performing the operations and steps discussed herein.

The computer system 800 may further include a network interface device 822. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker).

The secondary memory 816 may include a machine-readable storage medium (or more specifically a computer-readable storage medium) 824 on which is stored one or more sets of instructions 826 (e.g., inference engine 633) embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting machine-readable storage media.

The machine-readable storage medium 824 may also be used to store the inference engine 633, and/or a software library containing methods that call the encryption system and/or access restriction module. While the machine-readable storage medium 824 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

Some portions of the detailed description above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "determining", "encrypting", "decrypting", "sending" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A computer-implemented method comprising:
   categorizing one or more business process application service groups, each business process application service group comprising one or more nodes of a plurality of nodes, the one or more nodes contributing to a business process;
   analyzing an ontological definition of an enterprise network comprising the plurality of nodes, wherein the ontological definition describes operational usage and current state of the plurality of nodes;
   identifying, based on the ontological definition of the enterprise network, one or more structures within the enterprise network to identify at least one uncategorized business process application service group; and
   determining whether the identified uncategorized business process application service group correlates to the one or more categorized business process application service groups to categorize the identified uncategorized business process application service group, wherein the determining comprises comparing an ontological structure of the identified uncategorized business process application service group to an ontological structure of the one or more categorized business process application service groups.

2. The method of claim 1 wherein identifying the at least one uncategorized service group comprises identifying at least one communication relationship between the one or more nodes of the enterprise network in the ontological definition of the enterprise network.

3. The method of claim 1 further comprising:
   assigning an ontological index score to the one or more categorized business process application service groups;
   assigning an ontological index score to the identified uncategorized service group; and
   comparing the ontological index score of the one or more categorized business process application service group with the ontological index score of the identified uncategorized service group.

4. The method of claim 3 further comprising assigning at least one component of the ontological index score to at least one communication relationship of the respective categorized business process application service group or identified uncategorized service group.

5. The method of claim 3 further comprising:
generating at least one offset of the ontological index score of the one or more categorized business process application service groups; and
applying the offset when comparing the ontological index score of the one or more categorized business process application service groups with the ontological index score of the identified uncategorized service group.

6. The method of claim 1 wherein comparing the ontological structure of the identified uncategorized business process application service group to the ontological structure of the one or more categorized business process application service groups utilizes a number of layers of the ontological structure of the one or more categorized business process application service groups.

7. The method of claim 1 wherein categorizing one or more business process application service groups comprises:
receiving an indication of a primary application; and
determining an ontological structure for the primary application.

8. The method of claim 7 wherein determining an ontological structure for the primary application comprises:
determining one or more executables of the primary application; and
determining the one or more nodes that have a communicates_with relationship during execution of the one or more executables.

9. The method of claim 8 wherein determining the one or more nodes that have a communicates_with relationship with the primary application comprises:
receiving data from a plurality of software agents deployed to the plurality of nodes of the enterprise network, the data indicating one or more source-to-destination connections of the primary application; and
processing the data received from the plurality of software agents to determine one or more communicates_with relationships of the primary application.

10. The method of claim 1 further comprising generating the ontological definition of the enterprise network by:
receiving data from a plurality of software agents deployed to the plurality of nodes of the enterprise network, the data indicating one or more source-to-destination connections of one or more applications executing on the plurality of nodes; and
processing the data received from the plurality of software agents to determine one or more communicates_with relationships between the plurality of nodes.

11. A system comprising:
an administration console comprising:
a memory;
a processor, coupled to the memory;
a knowledge base module, executed from the memory by the processor, that stores an ontological definition of an enterprise network comprising a plurality of nodes, wherein the ontological definition describes operational usage and current state of the plurality of nodes; and
an inference engine, executed from the memory by the processor, to analyze the ontological definition of the enterprise network; to identify, in view of the ontological definition of the enterprise network, one or more structures within the enterprise network to identify at least one uncategorized business process application service group; and to determine whether the identified uncategorized business process application service group correlates to one or more categorized business process application service groups to categorize the identified uncategorized business process application service group, wherein the determining comprises comparing an ontological structure of the identified uncategorized business process application service group to an ontological structure of the one or more categorized business process application service groups.

12. The system of claim 11 wherein the inference engine is further to:
calculate an ontological index score for the one or more categorized business process application service groups;
calculate an ontological index score for the identified uncategorized service group; and
compare the ontological index score of the one or more categorized business process application service groups with the ontological index score of the identified uncategorized service group.

13. The system of claim 12 wherein the ontological index score is dependent on one or more communication relationships of the respective categorized business process application service group or identified uncategorized service group.

14. The system of claim 11 wherein the inference engine is further to utilize the number of layers of the ontological structure of the one or more categorized business process application service groups to compare the ontological structure of the identified uncategorized business process application service group to the ontological structure of the one or more categorized business process application service groups.

15. The system of claim 11 wherein the administration console is further to provide an interface that allows a user to indicate a primary application of a business process application service group, the system comprising a traffic analysis module to generate an ontological description for the primary application comprising nodes of the enterprise network that communicate with each other during execution of the primary application.

16. A non-transitory computer-readable medium comprising computer-executable instructions for execution by at least one processor, that, when executed, cause the at least one processor to perform a method comprising:
categorizing one or more business process application service groups, each business process application service group comprising one or more nodes of a plurality of nodes, the one or more nodes contributing to a business process;
analyzing an ontological definition of an enterprise network comprising the plurality of nodes, wherein the ontological definition describes operational usage and current state of the plurality of nodes;
identifying, based on the ontological definition of the enterprise network, one or more structures within the enterprise network to identify at least one uncategorized business process application service group; and
determining whether the identified uncategorized business process application service group correlates to the one or more categorized business process application service groups to categorize the identified uncategorized business process application service group, wherein the determining comprises comparing an ontological structure of the identified uncategorized business process application service group to an ontological structure of the one or more categorized business process application service groups.

17. The non-transitory computer-readable medium of claim 16 wherein the method further comprises:
 identifying one or more communications relationships between one or more nodes of the enterprise network that correlate to one or more communications relationships of one of the business process application service groups.

18. The non-transitory computer-readable medium of claim 16 wherein the method further comprises:
 identifying an ontological structure of a primary application of the business process application service groups.

* * * * *